2,808,367
HYDROCARBON CONVERSION PROCESS

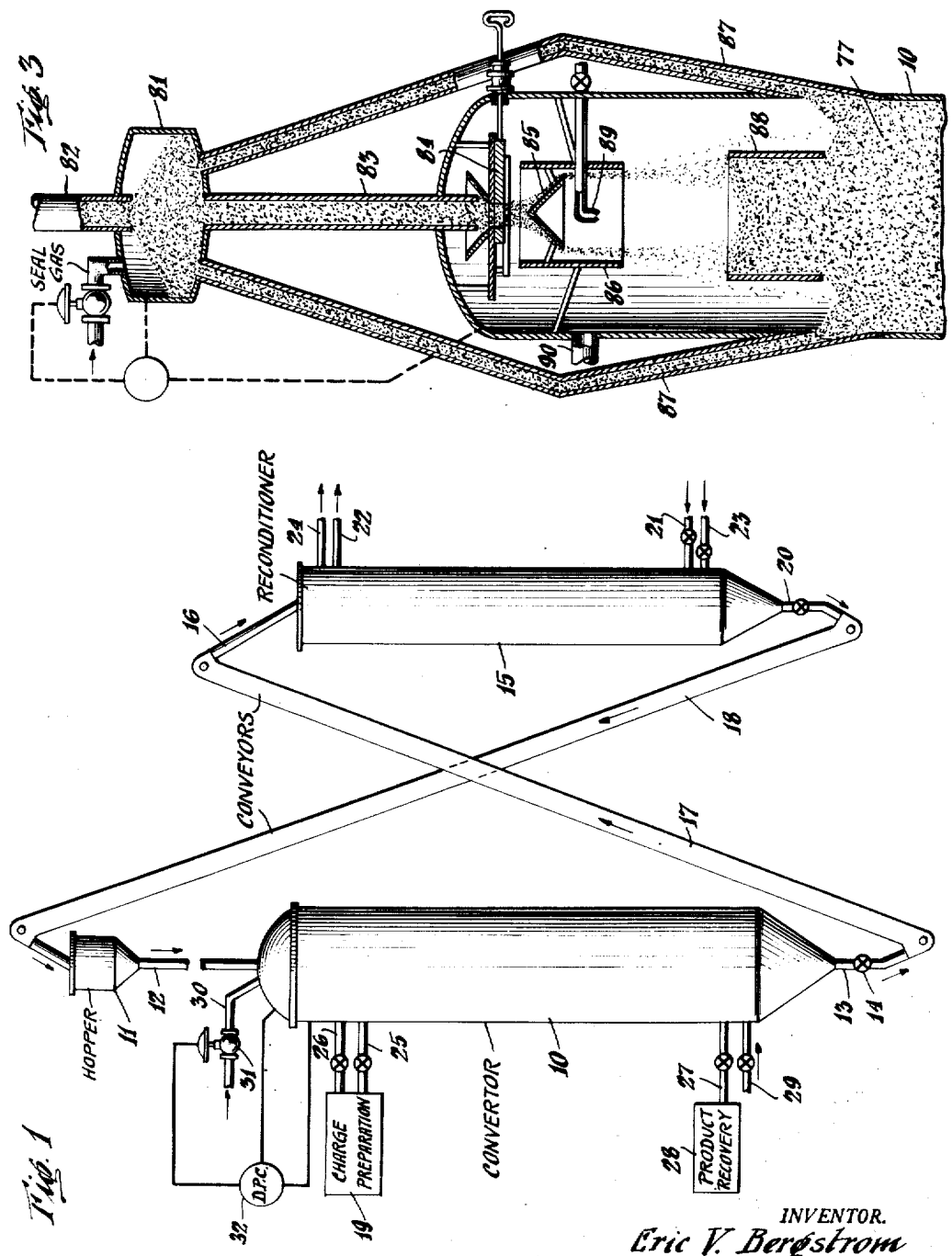

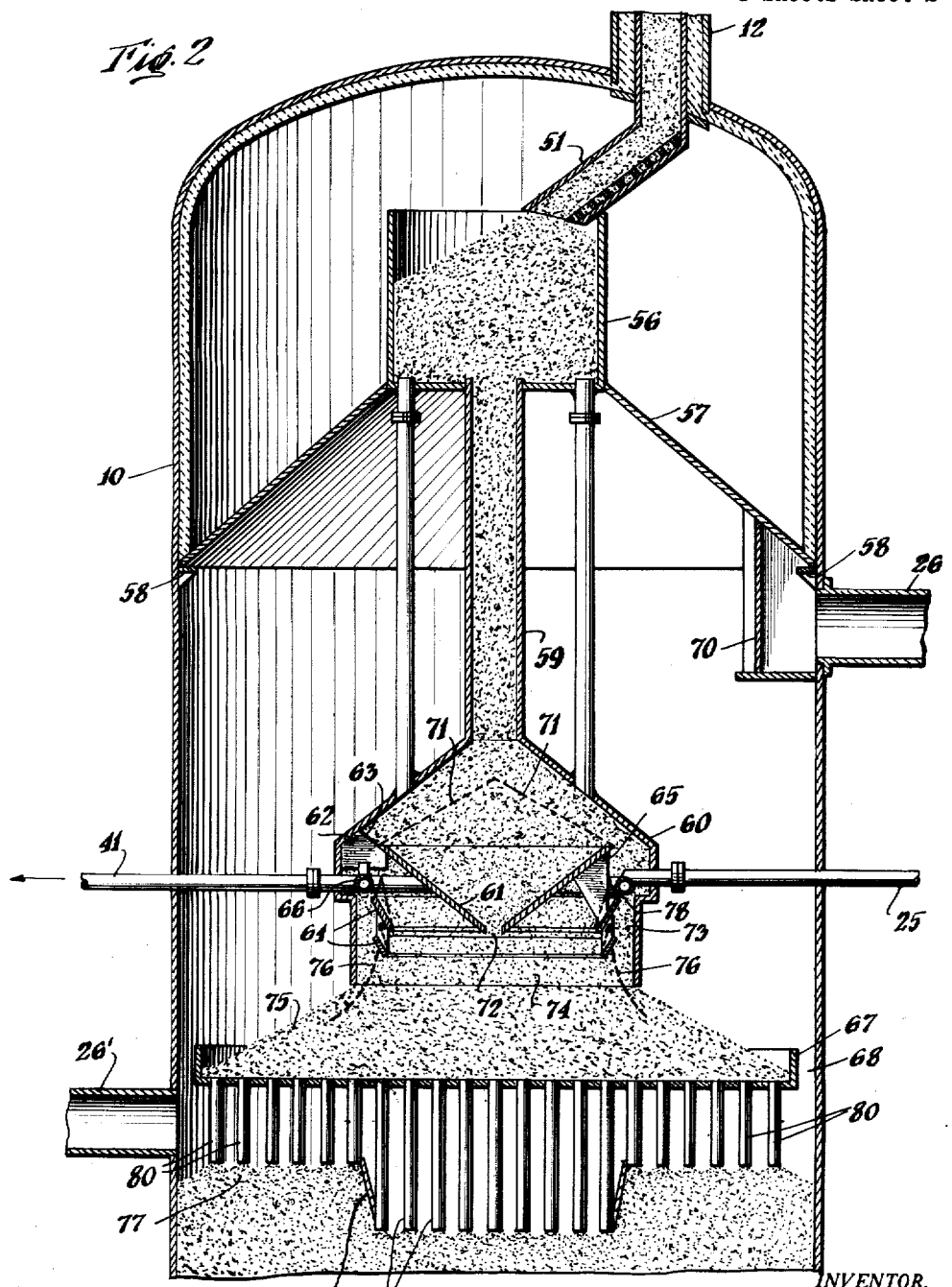

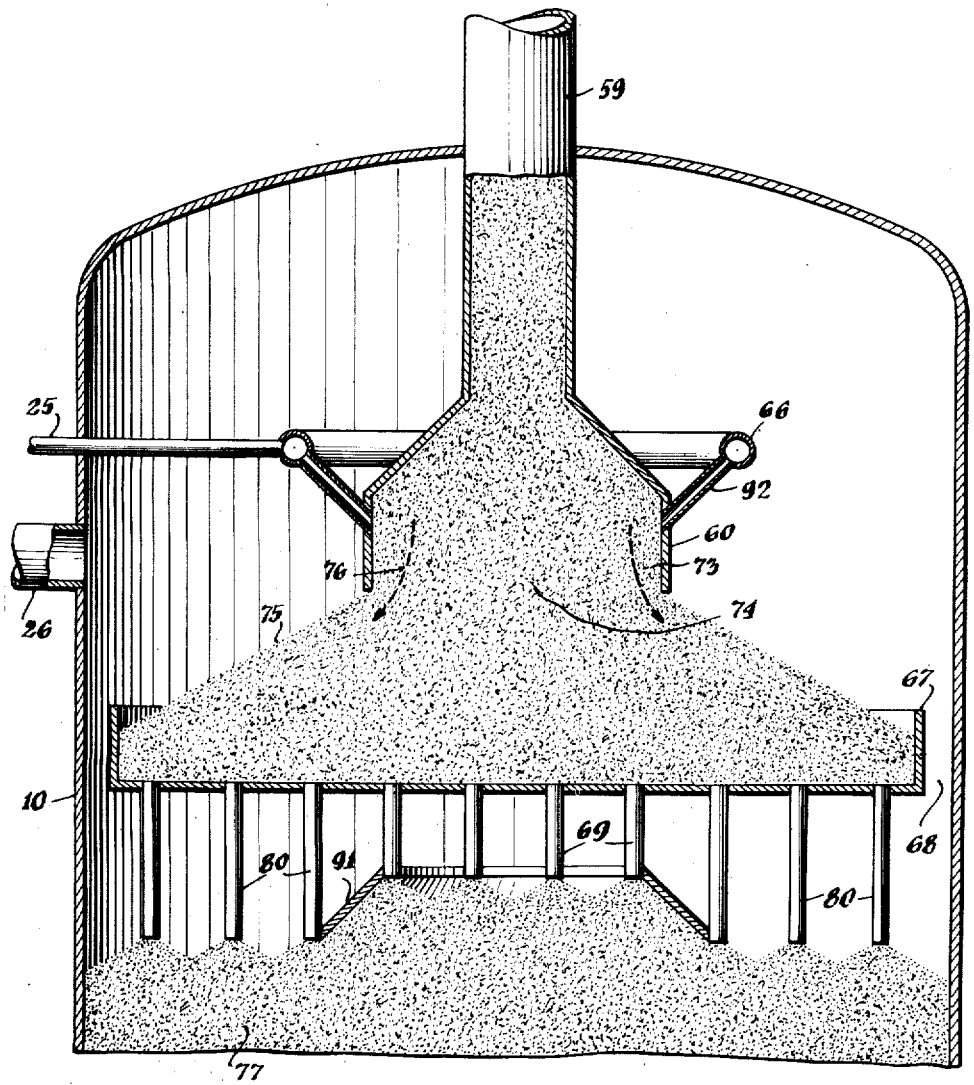

Eric V. Bergstrom, Short Hills, N. J., assignor to Socony Mobil Oil Company, Inc., a corporation of New York Application January 27, 1953, Serial No. 333,488

7 Claims. (Cl. 196—52)

This invention pertains to a method and apparatus for the conversion of fluid hydrocarbons in the presence of a moving mass of granular contact material. It is particularly concerned with overcoming temperature differentials which may exist across the moving mass due to contact material being supplied to one portion of the mass at a substantially different temperature than it is supplied to the remainder.

Typical of process to which this invention applies is the catalytic cracking conversion of a hydrocarbon charge, a portion of which is supplied as a liquid while the remainder is supplied as a vapor, in the presence of a granular adsorbent catalytic solid. The catalytic solid is passed cyclically through successive zones, in the first of which it is contacted by the hydrocarbon charge at temperatures of 850° F. and upward to effect the desired conversion, and in the second of which carbonaceous contaminants deposited on the catalyst by the conversion reaction are burned off by means of a suitable fluid regeneration medium. The catalyst passes through these two zones as a downwardly gravitating, substantially compact bed. Other exemplary processes include the catalytic reforming, polymerization, aromatization, and the like, of fluid hydrocarbons in the presence of granular catalysts and the thermal vis-breaking, coking or cracking of fluid hydrocarbons in the presence of granular inert solids.

In processes wherein the contact material is catalytic in nature, it may partake of the nature of natural or treated clays, bauxite, activated alumina, and the like, or synthetic associations of silica, alumina, or silica and alumina, to which certain metallic oxides may be added in small amounts for specific purposes. When the contact material is inert in character, it may partake of the form of refractory materials such as zirkite, corhart material or mullite, or it may partake of the form of stones or metallic particles or balls. The contact material should be of palpable particulate form as distinguished from finely divided powders, and the term "granular" should be understood herein to refer to contact material of such form. Generally, the contact material should be within the size range one inch to 100 mesh, and preferably 4 to 20 mesh by Tyler Standard Screen Analysis.

In conversion processes of the aforementioned types, uniformity of contacting between the fluid hydrocarbon charge and the contact material is desirable so as to promote uniform conversion of the charge oil, and uniform coke deposition on the contact material and thereby achieve maximum utilization of the reaction zone. In many commercial systems wherein a liquid and vapor charge are converted, such as catalytic cracking, the desired reaction temperature is substantially above the temperature to which either the liquid or the vapor portion of the fluid charge can be heated without thermal conversion. Thermal conversion of the charge in the preheater is, of course, undesirable so that it is necessary to supply the two components of the fluid charge at temperatures below their thermal conversion temperatures and to supply the heat required to elevate the temperature of the charge to the desired conversion temperature, as well as any heat of reaction required, by some other means. This heat is most easily supplied to the reaction zone by supplying the contact material charged to the reaction zone at a temperature suitably above the desired conversion temperature and mixing the fluid charge therewith to bring it to the conversion temperature. Thus, the fluid charge and contact material will be supplied to the reaction zone at widely different temperatures. Unfortunately, it is almost impossible to obtain one hundred percent uniformity of mixture of the liquid component of the fluid charge and the contact material when initially charged to the reactor by any of the methods presently in use. When the common method of supplying the liquid charge by spraying it into a tubular shower of contact material is employed, the contact material particles nearer the liquid spray contact more liquid than those further removed. Thus, the particles nearer the spray are cooled to a greater extent than those further removed. Also, in this type system, it is usual to control the contact material bed surface below the liquid spray level by supplying the bed with a plurality of fresh contact material streams which never contact any liquid.

A similar result occurs when the liquid is injected into a moving compact stream of contact material. In fact, in a recently developed liquid feed system of this type, it was found desirable to spray liquid into a high velocity, substantially compact stream constituting most of the contact material charge and permitting the vapors formed to expand into a low velocity contact material stream which contacts no liquid, thereby avoiding excessive pressure drops. Both streams then pass into different portions of the reaction bed. In all of the aforementioned methods, contact material passing down through some portions of the reaction bed has contacted more liquid and is therefore cooler than contact material passing through other portions of the bed cross-section. This promotes a non-uniform temperature distribution across the reaction bed and a non-uniform conversion of the vapor portion of the oil feed, which is often the major portion of the total oil feed.

A major object of this invention is to provide, in a hydrocarbon conversion process and apparatus employing a moving reaction bed of granular contact material, a method and apparatus for supplying contact material and vapor hydrocarbon charge to the reaction bed which overcomes the above-described difficulties.

Another object of this invention is to provide a method and apparatus for the conversion of a fluid hydrocarbon charge as a liquid fraction and a vapor fraction in the presence of a moving compact reaction bed of contact material, which is supplied with contact material at a substantially different temperature than the fluid hydrocarbons, which method and apparatus avoids excessive temperature gradients across the reaction bed.

These and other objects of this invention will be apparent from the following discussion of the invention.

Generally, this invention applies to hydrocarbon conversion systems which are charged with separate liquid and vapor hydrocarbon feeds when the liquid feed has contacted contact material delivered to certain regions of the horizontal cross-section of the compact reaction bed to a greater extent than that delivered to others, so that the contact material is delivered to some portions of the bed at a substantially lower temperature than to others. In this invention, by baffling or controlling the flow in or to the bed, the vertical length of the portion of the bed supplied with cooler contact material is made substantially different from that supplied with hotter contact material. A vaporized hydrocarbon feed is supplied to the reaction zone at a temperature substantially different from that of the contact material supplied thereto and is passed downwardly through the reaction bed. The relative heights of the longer and shorter portions of the bed are adjusted relative to the vapor feed temperature, so that when the vapor passes downwardly in greater proportion through the shorter portion than the longer, the non-uniformity in bed temperature is substantially corrected. Thus, in the usual case, when the vapor portion of the feed is supplied at a substantially lower temperature than the initial contact material feed, the portion of the bed supplied with the hotter contact material is made the shorter portion, so that more vapor passes through that portion than through the other, thereby tending to promote more uniform temperature all across the bed.

This invention will be best understood by referring to the attached drawings, of which Figure 1 is an elevational view of a typical hydrocarbon conversion system to which this invention may be applied;

Figure 2 is an elevational view, partially in section, of the upper section of a hydrocarbon conversion reactor employing one form of this invention;

Figure 3 is an elevational view, partially in section, of a hydrocarbon conversion reactor employing a second form of this invention; and Figure 4 is an elevational view, partially in section, of the upper section of a hydrocarbon conversion reactor employing another form of this invention.

All of these figures are diagrammatic in form and like parts in all bear like numerals.

This invention will be described for purposes of clarity in connection with a hydrocarbon conversion system wherein the granular contact material provides the heat of reaction for the fluid hydrocarbons and the heat required to raise the temperature of the fluid charge from that to which it can be heated without thermal conversion in the preheaters to the desired conversion temperature substantially thereabove. Thus, initially, in this system the contact material will be at a substantially higher temperature than the vapor portion of the charge.

Turning now to Figure 1, there is shown an upright, elongated conversion vessel or housing 10 supplied with granular contact material, for example, a granular silica-alumina catalyst, from a supply hopper 11 through a gravity feed leg 12 and provided with a contact material drain leg 13 bearing flow control valve 14 on its lower end. Also shown is a separate reconditioner 15 having a contact material feed conduit 16 connecting into its upper end and a drain conduit 20 connected into its lower end. Conveyors 17 and 18 are provided for transfer of the contact material particles between converter and reconditioner. The conveyors may be of any suitable construction adapted to transfer hot contact material particles without severe breakage and attrition of the particles, for example, continuous bucket elevators or pneumatic lifts. In operation, fresh contact material, at a temperature suitable for hydrocarbon conversion, is passed from hopper 11 through feed leg 12 into the upper end of vessel 10. The temperature of the contact material might be about 1030° F. in a typical catalytic conversion system. Used contact material is withdrawn from the bottom of the vessel through conduit 13 at a rate, controlled by valve 14, which is in conformance with the requirements of the particular conversion operation involved. The used contact material is transferred by conveyor 17 to the upper end of reconditioner 15. In such processes as the catalytic cracking conversion of hydrocarbons, a substantial amount of carbonaceous contaminant is deposited upon the used contact material, in which case the reconditioner takes the form of a catalyst regenerator. Air is introduced into the lower section of vessel 15 through conduit 21 and is permitted to pass upwardly through the column of used contact material within vessel 15 to burn off the contaminant. Flue gas is withdrawn from the upper section of vessel 15 through conduit 22. In order to remove sufficient heat from the regenerating catalyst to prevent overheating of the catalyst to heat damaging levels, cooling tubes (not shown) may be provided within the reconditioner. These tubes may be supplied with a suitable cooling fluid through pipe 23. Cooling fluid may be withdrawn from the cooling tubes through pipe 24. Other regenerator constructions than that shown and described hereinabove are contemplated within the scope of this invention. If the process involved is a strictly non-catalytic process, for example, in which the amount of coke deposit on the particle-form contact material is negligible, or if it be a process wherein the amount of coke deposit is insufficient upon combustion to heat the contact material to the desired inlet temperature to the conversion vessel, the reconditioner 15 may take the form of an apparatus, the principal function of which is to heat the contact material. Considering again conversion vessel 10, high boiling hydrocarbons, for example, a petroleum fraction boiling above the gas oil range, from a suitable charge preparation system 19 may be supplied in heated condition into the upper section of vessel 10 through conduit 25. In a typical system this liquid charge might be at a temperature of about 750° F. Vaporized hydrocarbons are simultaneously supplied to the upper section of vessel 10 through conduit 26. The vaporized charge might be a petroleum gas oil supplied at about 790° F. and, typically, the vaporized charge might be eighty percent of the total charge while the remainder is supplied as a liquid. Converted gaseous hydrocarbon products which may contain high percentages of motor and aviation gasoline and fuel oils are withdrawn from the lower section of vessel 10 and passed through conduit 27 to a suitable product fractionator and recovery system 28. An inert purge gas, such as steam or flue gas, may be introduced into the contact material column within the lower section of housing 10 through conduit 29 for the purpose of stripping gaseous hydrocarbon products from the out-flowing used catalyst. An inert seal gas, such as steam or flue gas, may be introduced into the upper end of vessel 10 through conduit 30 at a rate so controlled by diaphragm valve 31 and differential pressure controller 32, to maintain an inert gaseous pressure adjacent to the lower end of contact material feed leg 12, above the gaseous pressure in the hydrocarbon conversion zone. In this manner escape of hydrocarbons through the catalyst feed system is prevented.

The details of the construction in the upper section of reactor 10 are shown in Figure 2. Contact material conduit 12 extends into the upper end of vessel 10 and terminates so as to discharge contact material into a centrally disposed receptacle 56. Receptacle 56 is supported by a frusto-conical partition 57 which extends inwardly and upwardly from a support member 58 on the walls of the vessel 10. Extending centrally and vertically downwardly from the bottom of receptacle 56 is conduit or passageway 59, which terminates within the upper section of vessel 10. A hood 60 is attached to the lower end of conduit 59. Hood 60 has a hollow, frusto-conical upper section which attaches at its small diameter to the lower end of passageway 59 and a hollow cylindrical lower section. The horizontal cross-sectional area of the lower section of hood 60 is substantially less than the horizontal cross-sectional area of vessel 10. Hood 60 forms the upper section of a conversion chamber or zone with the main body of the chamber or zone being formed by the remainder of vessel 10 below hood 60. A baffle 61, in the shape of an inverted, hollow cone, is fixed symmetrically within the upper section of hood 60 by support members 62 extending from hood 60. The upper end of baffle 61 has a cross-sectional area amounting to a major fraction of the horizontal cross-sectional area of hood 60, so that a narrow annular passageway for contact material flow is formed between hood and baffle. Spaced vertically beneath baffle 61 are vertically spaced-apart ring on hoop baffles 64 in the form of hollow, inverted, frusto-conical sections. The upper ends of said baffles enclose horizontal cross-sectional areas amounting to a major fraction of the horizontal cross-sectional area of hood 60. Baffles 64 are placed so as to maintain a narrow peripheral region of contact material flow between the baffles and the walls of hood 60 and a central region of substantially lower velocity contact material flow within the baffles 64, as is explained hereinbelow. Baffles 64 are supported from baffle 62 by spaced-apart support members 65. A liquid spray ring 66, having a diameter greater than the diameters of the upper ends of baffles 64, is positioned within hood 60 on a horizontal plane at a level between the uppermost of baffles 64 and baffle 61. A plurality of orifices penetrate the underside of ring 66, through which liquid charge may be injected or sprayed into the contact material which will flow in the narrow peripheral region between baffles 64 and the walls of hood 60. Liquid charge supply conduit 25 connects into one side of ring 66 and liquid charge recycle conduit 41 extends from the opposite side of the ring. A cylindrical receptacle or pan 67 is positioned centrally beneath hood 60 on a horizontal plane within the upper section of vessel 10 at a level suitable to receive contact material from hood 60 before it reaches the walls of vessel 10. Receptacle 67 has a horizontal cross-sectional area less than but approaching that of vessel 10, so that space 68 is defined between the sides of receptacle 67 and walls of 10. A plurality of vertical contact material conduits 69 extend downwardly from the bottom of receptacle 68 to a common level within the upper section of vessel 10. Conduits for the supply of vaporized hydrocarbon charge are provided at two levels in vessel 10, conduit 26 above receptacle 67 and conduit 26' at a level below the bottom of receptacle 67 but above the lower ends of conduits 69. A distributor baffle 70 is provided in front of conduit 26.

In operation, fresh granular contact material, at a temperature suitable for the desired conversion, gravitates into vessel 10 through conduit 12 into receptacle 56. Contact material passes downwardly from the lower section of the accumulation of contact material in receptacle 56 as a single, central, substantially compact stream through passage 59. This stream is expanded outwardly under the inclined surface of the upper end of hood 60 as a frusto-conical shaped stream. The stream, during expansion, takes this form because a substantially stagnant layer of contact material is maintained on the upper side of baffle 61. The upper limits of this layer are shown by lines 71. A small hole 72 is provided in the bottom of baffle 61, so that the contact material forming the stagnant layer on 61 will slowly be changed. This hole 72 should not be so large as to allow any substantial flow of contact material in relation to that flowing around the stagnant layer. Hole 72 is not necessary to the invention and may be eliminated, if desired. Substantially, all of the contact material supplied to the conversion zone within vessel 10 passes through this frusto-conical stream and annular passage 63, and is supplied to an area adjacent the periphery of a single, central, substantially compact, downwardly gravitating feed column or stream of contact material maintained below baffle 61 within the lower section of hood 60. Because the hood 60 is of cross-section only a minor fraction of the cross-section of the reactor, yet carries the entire flow of contact material to the reaction bed, a peripheral region 73 of high velocity contact material flow and a central region 74 of substantially lower velocity contact material flow are formed near the lower end of the hood. Baffles 64 act to extend these regions upwardly in the feed column in hood 60 and cause the formations of the regions at higher levels in the feed column. The formation and maintenance of these high and low velocity regions are made possible by the flow characteristics of granular solids. The contact material column or stream leaving hood 60 is expanded outwardly in free surface flow to a horizontal cross-sectional area approaching that of vessel 10. Contact material from the central region 74 passes substantially unidirectionally downwardly to form the central region of the accumulation of contact material 75 in receptacle 67. The contact material to supply the remainder of the accumulation 75 is formed by contact material drawn from a narrow peripheral region of the stream in hood 60. Thus, contact material flowing in the peripheral region between the lines of internal flow 76 and the walls of hood 60 supplies all the area of accumulation 75 not lying substantially directly beneath hood 60. Contact material from accumulation 75 passes downwardly through passages 69 and 80 to supply contact material to the upper surface of a downwardly gravitating, substantially compact reaction bed of contact material 77. Contact material particles pass through bed 77 at a substantially uniform velocity across the horizontal cross-section of the bed and therefore contact material is drawn at about an equal rate from each of uniformly spaced conduits 69 and 80 and from accumulation 75 thereabove. Therefore, the flow of contact material through each unit of horizontal cross-sectional area of accumulation 75 will be the same. Hood 60, and therefore the feed stream or column therein, have a horizontal cross-sectional area amounting to only a small or minor fraction of the horizontal cross-sectional area of the accumulation 75 and of vessel 10 and reaction bed 77. Therefore, the central area of accumulation 75, which is supplied by the large central region of the feed column in hood 60, will carry only a small or minor fraction of the total contact material flow to bed 77; on the other hand, the narrow peripheral region 73 of the feed column supplies the major portion of accumulation 75 and bed 77, and therefore the velocity in region 73 will be substantially higher than in region 74, and more of the contact material will pass through region 73 than region 74. It will be noted that line 76, which defines the area of the feed column in hood 60 supplying the outer area of accumulation of contact material 75, slopes inwardly away from the walls of hood 60, so that area 73 increases the further it is removed from the bottom of the feed column. As the area increases, the velocity decreases; therefore, where the dimensions of the hood require it, baffles 64 are so placed that at succeedingly higher levels they again narrow the peripheral region 73 so as to maintain it generally below 8 inches in width, and preferably within the range 3.5 to 6 inches in width, thus maintaining the high velocity in region 73 at higher levels in the feed column. A new flow pattern line 78 is formed with each baffling, closer to the walls of hood 60 than the one below. Liquid hydrocarbon charge is supplied to spray device or ring 66 by means of passage 25. Spray ring 66 is at a level substantially above the lower end of hood 60 and the feed column therein. A portion of the liquid charge supplied through 25 is injected into high velocity region 73 of the feed column by means of the orifices in the inner side of ring 66. The remainder of the liquid charge is removed from the opposite end of ring 66 through passage 41 to the run-down tank, where it is cooled by mixture with the accumulation of cooler liquid charge therein before return to ring 66. By this means the liquid in ring 66 may be maintained cooler than the contact material flowing around the ring and coking in the orifices in the ring 66 minimized. Liquid injected into region 73 immediately mixes with the large volume of hot contact material flowing therein. This contact material will exist at a temperature well above the desired conversion temperature and even further above the temperature of the liquid. Thus, the liquid charge will be vaporized and partially converted to vapors as it passes downwardly with the contact material through region 73. The vapors so formed can immediately expand between baffles 61 and 64 into the lower velocity region 74, which is of relatively larger cross-section, so that the flow of contact material through the feed column will not be disrupted. The vapors so formed expand into the accumulation of contact material 75, from which they pass into the upper end of bed 77 mainly by passing out of the open upper surface of accumulation 75 and then through space 68 into bed 77. Some vapors may also pass downwardly through conduits 69 and 80. This system of liquid hydrocarbon charge is described and claimed in U. S. patent application, Serial No. 311,286, filed September 24, 1952. The contact material which has passed through peripheral region 73 will be at a lower temperature than that which has passed through central region 74, since the vaporization and cracking of the liquid hydrocarbons will reduce the temperature of this portion of contact material. Also, due to conversion of the liquid charge, this portion of contact material will have a greater amount of coke thereon than that which has passed through central region 74. The cooler contact material from region 73 passes downwardly onto the reaction bed 77 through passages 80, which terminate on a common level. The hotter contact material from region 74 passes onto the reaction bed 77 through passages 69, which terminate on a common level substantially below that of conduits 80. A confining cylinder or inverted cone 91 is provided between the innermost of conduits 80 and the outermost of conduits 69. This serves to provide a sharp transition from the longer bed length under conduits 80 to the shorter bed length under conduits 69 and prevents the outermost of conduits 69 from being buried under contact material expanding outwardly from the innermost of conduits 80. The member 91 is not, however, essential to the invention and may be eliminated, if desired. Vapor charge, which may be a petroleum gas oil, may be admitted through either conduit 26 or conduit 26'. This vapor charge will be at a temperature substantially below the temperature at which contact material is supplied to the reaction bed through either conduits 69 or 80. The contact material streams flowing through conduits 69 enter the reaction bed between streams supplied with the cooler contact material, so that sufficiently beneath them at the level of their lower ends, while the streams flowing in conduits 80 perform the same function in the area which they serve. Thus, since there is a common draw-off system for gaseous products horizontally across the lower section of bed 77, the portion of the reaction bed 77, which receives the hotter contact material through passages 69, is shallower or substantially less in vertical length than the portion of bed 77 receiving the cooler contact material through passages 80. As a result, a greater proportion of the cooler vapor will pass through the portion of the reaction bed below conduits 69 than passes through the portion below conduits 80. The relative heights of the cooler and hotter portions of bed 77 are adjusted by adjusting the relative lengths of conduits 69 and 80, so that a sufficiently greater amount of vapor enters the shorter portion below conduits 69 than the longer portion below conduits 80 to substantially correct the non-uniformity of temperature across the bed due to the supply of liquid feed to only a part of the contact material. Generally, the temperature gradient, due to supplying liquid feed to only a part of the contact material, should be, at a level 10 feet below the shallow part of the bed, less than 50° F., and preferably less than 10° F. Another advantage of this invention, where the vapor charge is cooler than the contact material charge, is equalization of coke on the contact material particles. Where the contact material is a catalyst, substantial amounts of coke are laid down on the catalyst as previously explained. As is well known to those skilled in the art, it is desirable that all of the catalyst particles have about the same amount of coke to effect efficient use of the regenerator. Now, those particles which have contacted the liquid charge already have a substantial coke deposit when supplied to the reaction bed. However, by this invention these particles are subjected to a smaller proportion of the vapor charge than the substantially coke-free particles, so that the vapor charge deposits more coke on the catalyst which has the least coke when supplied to bed 77 and thereby tends to equalize coke deposits on all the catalyst particles.

This invention also is applicable where the vaporized hydrocarbon charge is supplied at a higher temperature than the contact material. This may occur when the vapor charge is a petroleum naphtha boiling in the gasoline range which is to be reformed. In this situation, the region of bed 77, supplied with the hotter contact material, is made sufficiently longer than the region supplied with the cooler contact material, so that sufficiently more vapor will pass through the cooler portion to effect a substantial equalization of temperature across the bed. The advantage of equalization of coke on the contact material particles is not present in this case, however.

This application of this invention to a process wherein the liquid charge is sprayed into a tubular curtain of contact material is illustrated in Figure 3. Shown there is the upper section of a conversion vessel or chamber 10. Situated above this vessel is a separate seal chamber 81 supplied with fresh contact material through a feed leg 82. A major portion of the contact material, for example, about eighty percent, gravitates from the seal chamber through control passage 83 into the upper end of conversion chamber 10. In normal operation, this contact material passes through open slide valve 84 and is baffled into a tubular shower by upwardly tapered symmetrical baffle 85, which terminates with apex beneath conduit 83 and on the center line of conduit 83. A skirt 86 is provided around baffle 85. The remainder of the contact material supplied to chamber 81, for example, about twenty percent, flows downwardly as a plurality of compact streams through conduits 87. These conduits only enter the conversion chamber on their lower ends. Conduits 87 terminate at the level at which it is desired to maintain the outer portion of reaction bed 77. A cylinder 88 is maintained within the upper section of chamber 10 with lower end at a level adjacent the lower ends of conduits 87. This cylinder 88 is adapted to catch the major portion of the contact material from the tubular shower and thereby acts as a baffle to increase the height of bed 77 in its center portion. Liquid hydrocarbon charge is sprayed into the shower by means of spray device 89 and cools at least the major portion of the contact material therein by vaporization and cracking. This cooled contact material then is caught by cylinder 88 and feeds the center of bed 77. Much of contact material from the shower may pass over the outside of cylinder 88, but in the main such contact material will have been on the outside of the shower where it contacts the liquid less than the particles toward the inside of the shower. This concentrates the cooler contact material which has been contacted with liquid in a longer portion of bed 77 at its center, while the hotter contact material, mainly from conduits 87, is around the outside of the bed in a shorter portion thereof. Vaporized charge is supplied through conduit 90 at a temperature substantially below that of the contact material supplied to either part of the reaction bed. Cylinder 88 is of such a height that the central portion of bed 77, supplied with cooler contact material, is sufficiently longer than the outer portion of the bed supplied with hotter contact material that a sufficiently greater amount of vapor passes through the shorter portion to correct the non-uniformity of temperature across the reaction bed.

Figure 4 illustrates the use of this invention when the vapor supplied to the reactor is at a higher temperature than the contact material. The contact material gravitates into reactor 10 through passageway 59 and passes into hood 60. Within hood 60 are formed a high velocity region of flow 73 and the lower velocity flow region 74. Into region 73 is injected a liquid hydrocarbon charge through passages 92 from manifold 66. This charge is cooler than the catalyst and therefore causes the outer regions of accumulation 75 to carry cooler catalyst than that region lying immediately below hood 60. As explained above, the catalyst from the central region flows through pipes 69 immediately below hood 60 to reaction bed 77, while the cool catalyst flows to bed 77 through pipes 80 below the annular area surrounding hood 60. The vapor which is hotter than the catalyst is supplied through passage 26. Since the vapor is hotter than the catalyst, the outer annular region 77, fed by pipes 80, is made less in height than the central region containing the hotter catalyst and fed by pipes 69. Thus, more of the hot vapor will flow through the cool region below pipes 80 than through the hotter region below pipes 69, and the vapor will therefore tend to bring the temperatures of the two regions closer together.

The various parts of the improved apparatus of this invention may take many different forms than that shown herein. For example, while the reactor and like parts therein have been shown as being circular in cross-sectional shape, they may take any other desired shape, such as rectangular, hexagonal, etc.

The operating conditions within the reactor may vary widely depending upon the particular type of reactions carried out therein. The contact material should be supplied to the conversion zone at a temperature suitable to supply the heat of reaction plus the heat required to elevate the temperature of the hydrocarbon charge to the desired conversion temperature without the contact material falling below the desired conversion temperature. Generally, for catalytic operations, temperatures within the range 800 to 1200° F. are required. For thermal cracking operations, the contact material inlet temperature may range as high as 1700° F. Liquid and vaporized hydrocarbon charges should generally be heated before being supplied to the conversion zone to temperatures within the range about 600 to 900° F. The space velocity of the total hydrocarbon charge through the reaction bed should generally be within the range about 1 to 10 volumes of hydrocarbon charge (as 60° F. liquid) per volume of reaction bed per hour. The ratio of contact material to hydrocarbon charge should generally be within the range about 0.5 to 20 parts of contact material per part of charge by weight.

It should be understood that it is intended to cover herein all changes and modifications of the examples of this invention herein chosen for purposes of disclosure which do not constitute departures from the spirit and scope of the invention.

I claim:

1. In a process for the conversion of hydrocarbons wherein a liquid hydrocarbon feed is mixed with a granular contact material and then caused to pass with the contact material downwardly through a substantially compact bed of contact material in a reaction zone and the liquid has initially contacted contact material delivered to certain regions of the bed horizontal cross-section to a greater extent than others, so that contact material is delivered to some portions of the bed at substantially lower temperatures than to other portions, the improvement which comprises: controlling the flow of contact material to said bed so that the vertical length of the portion of the bed supplied with cooler contact material is substantially different from that supplied with hotter contact material, passing a vaporized hydrocarbon to the upper end of said bed at a temperature substantially different from the contact material supplied to the reaction zone, passing said vaporized hydrocarbon downwardly through the bed and withdrawing conversion products from the lower section of the bed, the vapor temperature differing from the initial contact material temperature in such a way that when the vapor passes downwardly in greater proportion through the shorter portion of the bed than through the longer portion, the non-uniformity in bed temperature is substantially corrected.

2. In a process for the conversion of fluid hydrocarbons wherein a liquid hydrocarbon feed is mixed with a granular contact material and then caused to pass with the contact material downwardly through a compact bed of contact material maintained within a confined reaction zone and the liquid has initially contacted contact material delivered to certain regions of the bed horizontal cross-section more than the liquid has contacted the contact material delivered to others, so that contact material is delivered to some portions of the bed at a substantially lower temperature than contact material is delivered to other portions of the bed, the improvement which comprises: controlling the contact material flow so that the vertical length of the portion of the bed supplied with the cooler contact material is substantially less than the portion of the bed supplied with the hotter contact material, supplying vaporized hydrocarbon feed to the reaction zone at a level above said bed and a temperature above that at which contact material is supplied to the reaction zone, said vapor feed comprising mainly hydrocarbons boiling in the gasoline boiling range and below, and maintaining the difference in length between said two portions such that a sufficiently greater amount of vapor enters said shorter portion than said longer portion to substantially correct the non-uniformity of temperature across said bed.

3. In a process for the conversion of fluid hydrocarbons wherein a liquid hydrocarbon feed is mixed with a granular contact material and then caused to pass with the contact material downwardly through a compact bed of contact material maintained within a confined reaction zone and the liquid has initially contacted contact material delivered to certain regions of the bed horizontal cross-section more than the liquid has contacted the contact material delivered to others, so that contact material is delivered to some portions of the bed at a substantially lower temperature than contact material is delivered to other portions of the bed, the improvement which comprises: controlling the contact material flow so that the vertical length of the portion of the bed supplied with the cooler contact material is substantially greater than the portion of the bed supplied with the hotter contact material, supplying vaporized hydrocarbon feed to the reaction zone at a level above said bed and at a temperature below the temperature at which contact material is supplied to the reaction zone, and maintaining the difference in length between said shorter portion and said longer portion sufficient to cause a sufficiently greater amount of vapor to pass downwardly through said shorter portion to substantially correct the difference in temperature across said bed.

4. In a process for the catalytic conversion of high boiling hydrocarbons wherein a minor portion of the total hydrocarbon feed is supplied to the process as a liquid and is a high boiling feed which is mixed with a granular adsorbent catalyst and then caused to pass with the catalyst downwardly through a compact bed of catalyst maintained within a confined conversion zone and the liquid feed before reaching the bed has contacted catalyst delivered to certain regions of the bed horizontal cross-section more than it has contacted the catalyst delivered to other regions so that the catalyst is delivered to some portions of the bed at a substantially lower temperature than the catalyst is delivered to other portions of the bed, the improvement which comprises: controlling the catalyst flow to the bed so that the vertical length of the portions of the bed supplied with the cooler contact material is substantially greater than the portions of the bed supplied with the hotter contact material, supplying the major portion of the hydrocarbon feed as a vapor boiling in the gas oil range to the reaction zone at a level above said bed and at a temperature below the temperature at which catalyst is supplied to the reaction zone, and maintaining the difference in vertical length between said two portions such that a sufficiently greater proportion of vaporized charge will pass downwardly through said shorter portion than said longer portion to substantially correct the difference in temperature between said two portions.

5. A continuous process for the conversion of fluid hydrocarbons in the presence of a granular contact material, which comprises: maintaining a downwardly gravitating, substantially compact bed of granular contact material within the lower section of a confined reaction zone, showering contact material downwardly through the upper section of said zone onto the surface of said bed and continuously removing contact material from the lower section of said bed, also supplying contact material to said bed as a plurality of compact streams, spraying a liquid hydrocarbon feed at a temperature below that of the contact material in said shower into said shower and thereby effecting cooling of at least a major portion of the contact material therein, supplying a vaporized charge to the reaction zone at a level above said bed and passing said vaporized charge into said bed, maintaining the portion of said bed which is supplied by a major portion of the contact material from said shower sufficiently greater in vertical length than the remainder of said bed that a sufficiently greater proportion of vaporized charge passes downwardly therethrough to effect a substantial equalization of temperature across the bed, and removing products of conversion from the lower section of said bed.

6. An apparatus for the conversion of a fluid hydrocarbon charge in the presence of a downwardly gravitating, substantially compact bed of contact material, which comprises in combination: an enclosed conversion chamber adapted to confine said bed, an enclosed seal chamber above said conversion chamber, means for supplying contact material to said seal chamber, means for supplying inert seal gas to said seal chamber, members defining a plurality of passages for contact material flow extending downwardly from said seal chamber to a common level a substantial distance below the upper end of said conversion chamber, means for supplying vaporized hydrocarbon charge to said conversion chamber at a level above the lower ends of said passageways, members defining a central passageway for contact material flow extending from said seal chamber centrally into the upper end of said conversion chamber and terminating at a level therein substantially above the lower ends of said plurality of passageways, a symmetrical baffle below said last-named passageway tapered to an apex lying centrally beneath said last-named passageway whereby contact material issuing from said passageway will be baffled into a tubular shower, means for spraying liquid hydrocarbons into said shower at a level substantially above the lower ends of said plurality of passageways thereby cooling contact material in said shower, a hollow, symmetrical member open on top and bottom positioned so as to catch a major portion of the contact material from said shower, the lower end of said member lying on a plane adjacent the lower ends of said passageways and the upper end extending to a level below said liquid spray means, the ratio of the horizontal cross-section of said member to the horizontal cross-section of said chamber being substantially less than the ratio of the rate of contact material flow in said shower to the total rate of contact material flow through said reactor, means for supplying vaporized hydrocarbons at a temperature substantially different from that at which contact material is supplied to said chamber, means for removing contact material from the lower section of said chamber, and means for removing products of conversion from the lower section of said chamber.

7. In a process for the conversion of hydrocarbons in the presence of a compact mass of granular contact material wherein at least a part of the hydrocarbon feed, which is at least partially in the liquid phase and at a substantially different temperature than the contact material, is mixed with granular contact material and the contact material thereafter is supplied to a downwardly moving compact bed of contact material therebelow and the hydrocarbon charge is passed through said bed, and wherein said hydrocarbon charge initially contacts contact material delivered to certain regions of the bed to a greater extent than contact material delivered to other regions of the bed, so that contact material is delivered to some portions of the bed at substantially lower temperatures than to other portions, the improvement which comprises: controlling the level of contact material inlets to the various regions of said bed so that the vertical length of the portion of the bed supplied with cooler contact material is substantially greater than that supplied with hotter contact material, passing hydrocarbon vapor at a temperature below that of the hotter contact material into the upper end of said substantially compact bed uniformly across the bed cross-section and then downwardly through the bed, withdrawing products of conversion from the lower section of said bed, and effecting equalization of temperature across the bed cross-section shortly below the bed upper surface by adjusting the relative vertical length of the regions supplied with hotter and cooler contact material so that a sufficiently greater quantity of vapor flows through the regions containing the hotter contact material than flows through those containing the cooler contact material to effect said temperature equalization.

References Cited in the file of this patent

UNITED STATES PATENTS

| | | |
|---|---|---|
| 2,432,344 | Sinclair | Dec. 9, 1947 |
| 2,556,514 | Bergstrom | June 12, 1951 |
| 2,574,850 | Utterback et al. | Nov. 13, 1951 |
| 2,683,109 | Norris | July 6, 1954 |
| 2,687,372 | Ray | Aug. 24, 1954 |

UNITED STATES PATENT OFFICE

CERTIFICATE OF CORRECTION

Patent No. 2,808,367

October 1, 1957

Eric V. Bergstrom

It is hereby certified that error appears in the printed specification of the above numbered patent requiring correction and that the said Letters Patent should read as corrected below.

Column 7, lines 40 and 41, strike out "conplied with the cooler contact material, so that sufficiently" and insert instead -- conduits 69 act to control the surface of bed 77 in the area --.

Signed and sealed this 12th day of November 1957.

(SEAL)
Attest:

KARL H. AXLINE
Attesting Officer

ROBERT C. WATSON
Commissioner of Patents